UNITED STATES PATENT OFFICE.

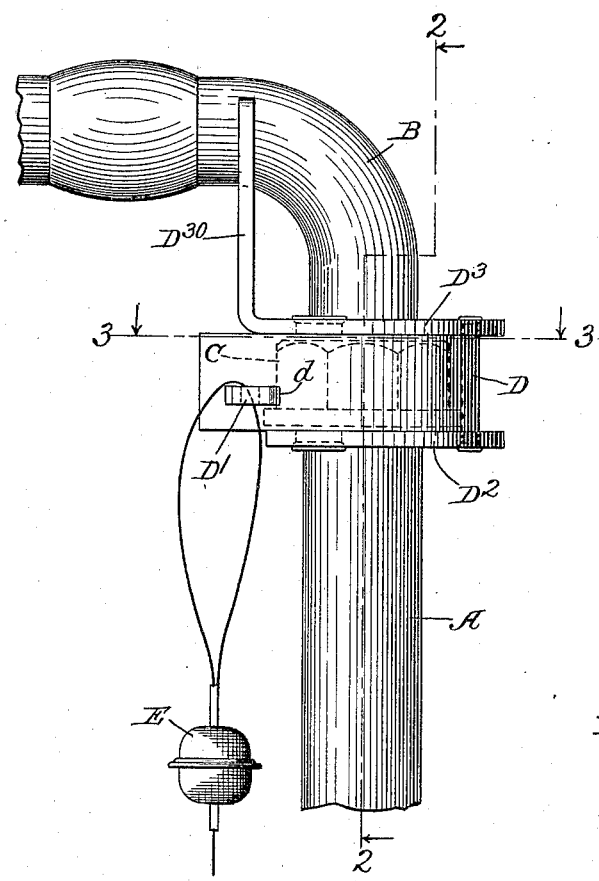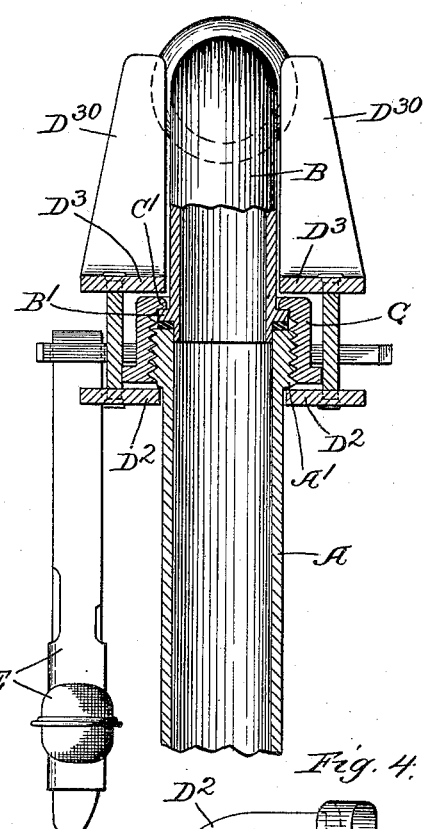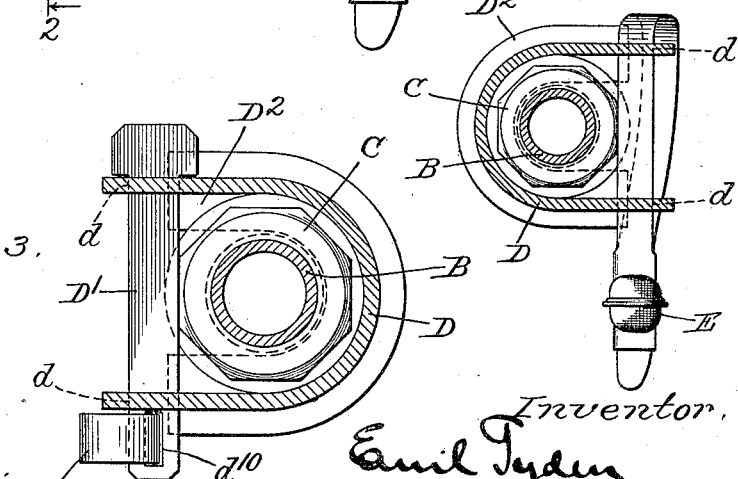

EMIL TYDEN, OF HASTINGS, MICHIGAN.

PIPE-JOINT LOCK.

SPECIFICATION forming part of Letters Patent No. 696,383, dated March 25, 1902.

Application filed June 22, 1901. Serial No. 65,560. (No model.)

*To all whom it may concern:*

Be it known that I, EMIL TYDEN, a citizen of the United States, residing at Hastings, in the county of Barry and State of Michigan, have invented certain new and useful Improvements in Pipe-Joint Locks, of which the following is a specification, reference being had to the accompanying drawings, forming a part thereof.

The purpose of this invention is to provide a device by means of which the stealing of gas, water, or other fluids supplied through pipes may be prevented or made impossible without mutilating the pipe or connections or the means used to prevent such action, and thereby insuring the discovery of the theft.

It consists in an appliance adapted to be secured upon a pipe-joint and guarded, preferably, by a seal having such engagement with the parts of the joint or the adjacent pipe as to prevent the rotation of the nut or other threaded element which must be rotated in order to open the joint.

In the drawings, Figure 1 is a side elevation of a portion of a pipe-line comprising a joint protected by my invention, which is shown in elevation thereon. Fig. 2 is a section at the line 2 2 on Fig. 1. Fig. 3 is a section at the line 3 3 on Fig. 1. Fig. 4 is a view similar to Fig. 3, showing the seal-strap operating as a shackle-closing bar.

I have shown my pipe-joint lock in a form adapted to be applied to a joint made with a union, this being the customary form of joint for the connection with a meter, whether a gas or water, and the only form of joint likely to be employed in situations where the protection of such a lock would be required.

A and B are the two pipe members in the union; C, the union-nut. The member A is the one having the threaded-boss terminal A', adapted to receive the nut, the member B being the one having the flange B', stopped by the corresponding inwardly-turned flange C' of the nut.

My locking device consists of a shackle D, adapted to stride the nut C and to receive a closing-bar or cross-bar D', which is most conveniently arranged to be inserted through apertures $d$ $d$ in the ends of the shackle and to be retained therein by means of a self-locking seal E, whose strap E' is inserted through the eye $d^{10}$ in one end of the closing-bar D', the other end having a head, by which it is stopped against the side of the shackle. The shackle has the lateral flanges $D^2$ $D^3$, which extend downward upon opposite sides of the nut C, their notch or aperture being of such width as to adapt them to pass over the pipe with very slight play or none at all thereon. One of the flanges $D^2$ thus engages behind the shoulder formed by the thread-boss A' of the pipe element A of the joint. The width of the shackle and consequent distance between the side flanges $D^2$ and $D^3$ will be made such as to permit such flanges to barely embrace the nut, one of them engaging behind the shoulder of the thread-boss, as described, so that any rotation of the nut tending to unscrew it from the thread-boss, and thus increase the distance between said boss and the opposite side of the nut, will be prevented by the flanges, which are rigid with the shackle and cannot be spread, as would be necessary to permit the threaded boss to withdraw from the nut in the unscrewing process. As a further protection, available in many and, indeed, in the majority of situations in which such locks would be required, I prefer to construct the shackle so that it shall be non-rotatable on the nut when it is closed by the cross-bar, and it is so shown in the drawings. One of the side flanges $D^3$ is then provided with laterally-projecting terminals $D^{30}$ $D^{30}$, constituting a fork which will embrace the pipe at the nearest bend of the latter. In the connection of gas-meters to the supply-pipe such a meter is usually found immediately back of the union, and this device is constructed with special reference to this more usual arrangement. When the shackle, with this laterally-projecting fork, is secured on the nut, the nut cannot be rotated to open the joint even though the construction of the joint is such as to leave no shoulder of the threaded boss to operate as first above described, preventing longitudinal separation of the two elements in the unscrewing process. I prefer to construct the device with both these precautions, each supplementing the other and both necessary, because in some instances it might be necessary to open the joints by screwing one of the pipe elements without disturbing the nut, and even in the case of the union, where there is the thread-boss having the suitable shoulder to engage the flange, an attempt to open the joint, although not successful to the extent of permitting the intruder to make a connection and consummate the intended theft, would, nevertheless, cause a leak at the joint in cases where it had not been closed by an interior pipe—as, for example, in cases in which a pipe having a meter suitably attached to it should be opened or attempted to be opened at the joint for the purpose of stealing gas or water without having it pass through the meter. In such cases the combination of the two devices would be effective to prevent either stealing or waste.

The cross-bar D' shown in the drawings may be omitted, the seal-strap being inserted through the slots in the shackle and operating as a cross-bar to retain the shackle. In my claims I intend the term "cross-bar" to denote not merely such a cross-bar as D', illustrated in the drawings, but any element, such as the strap of the seal, which may be inserted to retain the shackle in substantially the same manner as it is retained by the bar D'.

I claim—

1. A pipe-joint lock, consisting of a shackle adapted to stride the nut of the pipe-joint, and having flanges to engage at opposite sides of such nut the cross-bar closing the shackle, and means for securing the cross-bar in shackle-closing position; the shackle when thus closed being non-rotatable on such nut, and comprising a sideward-jutting arm to collide with the pipe at the nearest bend, to stop the rotation of the shackle and nut.

2. A lock for a pipe-union, comprising a shackle adapted to stride the nut and provided with a closing-bar for securing it in shackle-closing position; such shackle having lateral flanges to engage at opposite sides of the nut; one flange engaging behind the thread-boss of the threaded pipe member of the union; the shackle when closed by the bar being non-rotatable on the nut, and comprising a sideward-jutting arm, adapted to collide with the pipe at the nearest bend to stop the rotation of the shackle and nut.

Chicago, June 12, 1901.

EMIL TYDEN.

In presence of—
  ADNA H. BOWEN, Jr.,
  EDGAR L. CONANT.